April 29, 1969   L. A. LUEDTKE   3,441,122
BALE THROWER
Filed March 1, 1967
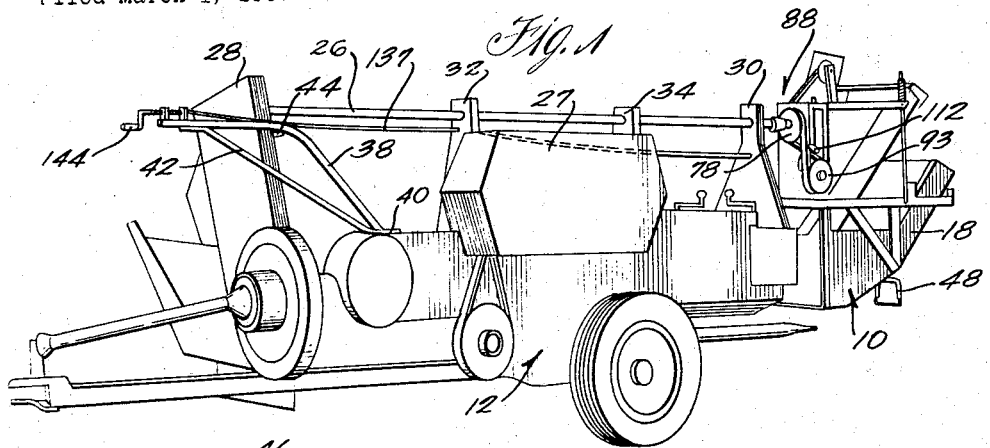
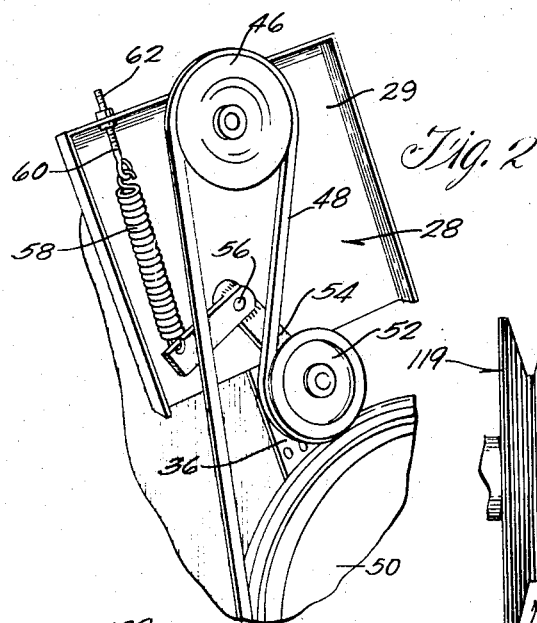
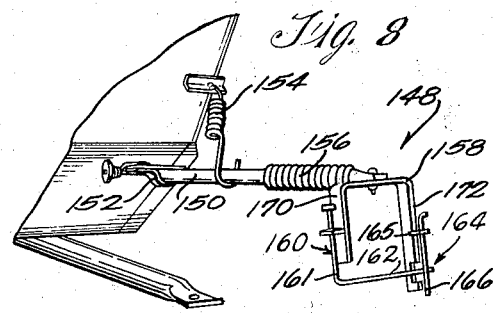
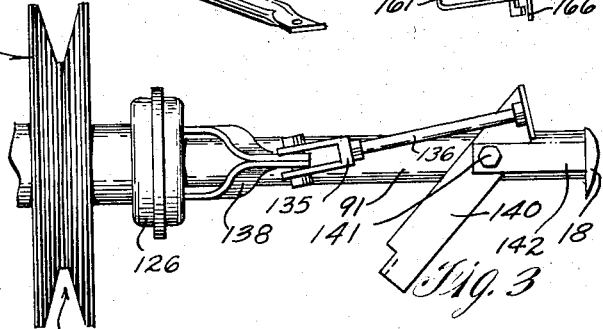
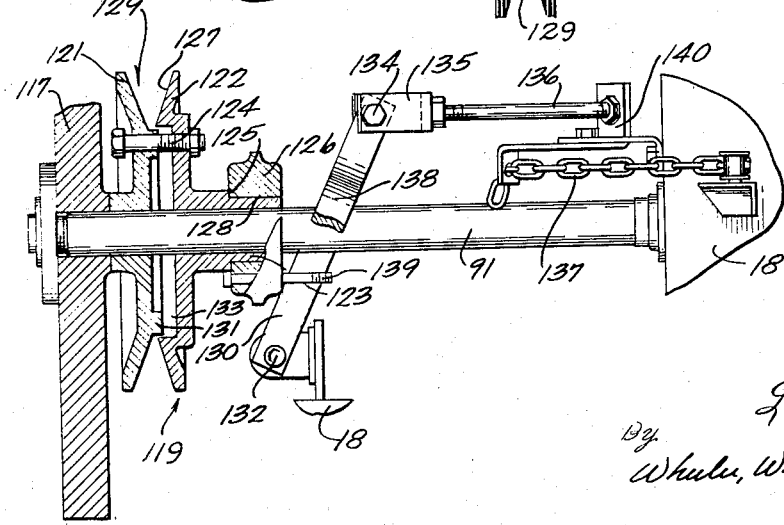
Inventor
Lloyd A. Luedtke
By
Wheeler, Wheeler, House, & Clemency
Attorneys

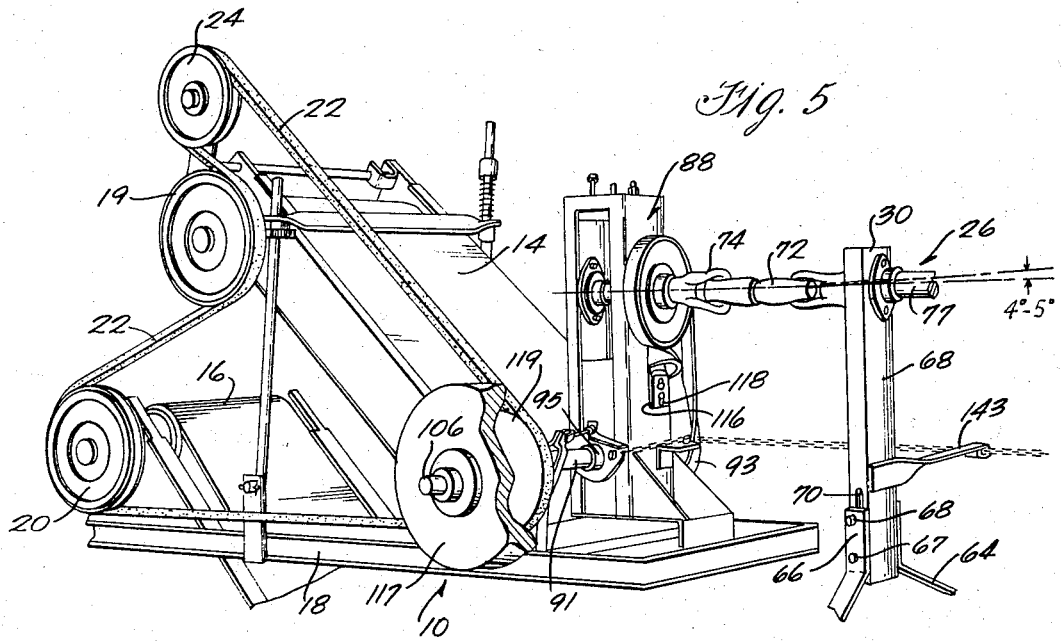
Fig. 5
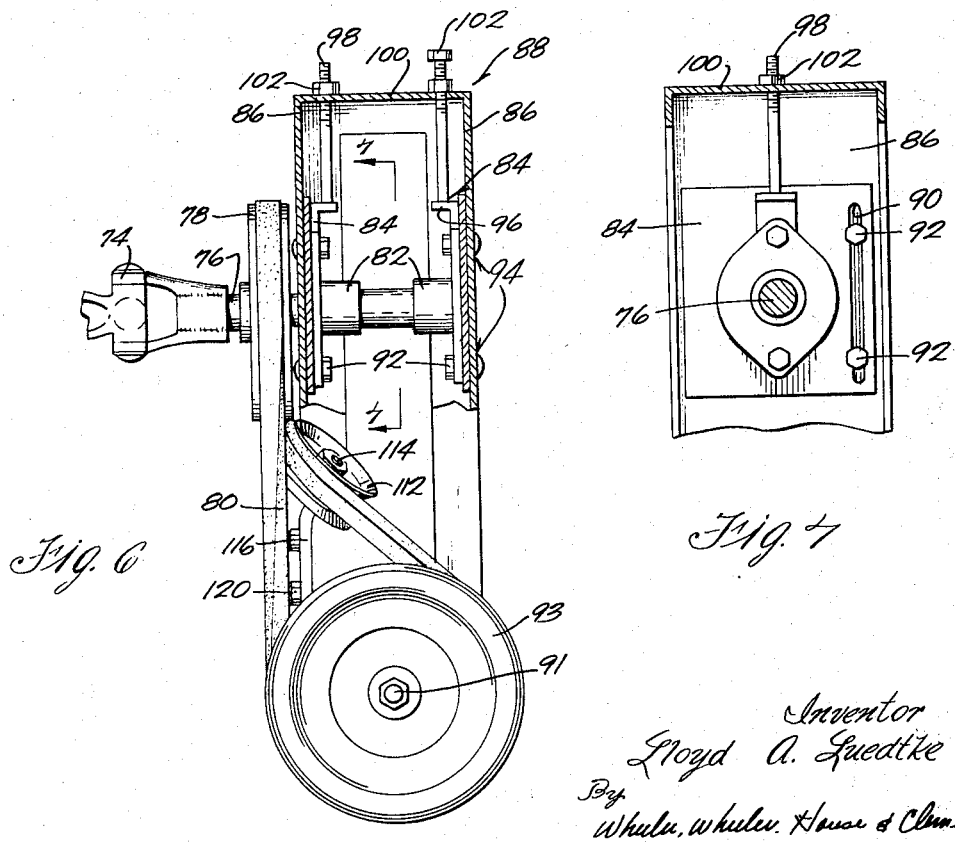
Fig. 6
Fig. 7
Inventor
Lloyd A. Luedtke
By Wheeler, Wheeler, House & Clissey
Attorneys

United States Patent Office 3,441,122
Patented Apr. 29, 1969

3,441,122
BALE THROWER
Lloyd Adlay Luedtke, P.O. Box 123,
Allenton, Wis. 53002
Filed Mar. 1, 1967, Ser. No. 619,799
Int. Cl. B65g *31/02*
U.S. Cl. 198—128                            14 Claims

ABSTRACT OF THE DISCLOSURE

Disclosed herein is a bale thrower which is adapted for connection to a baler or bale forming machine and which is driven by an overhead drive shaft located on the baler so as to supply power to the bale thrower from the baler. Adjustable bearing mountings are provided for supporting the drive shaft and for facilitating alignment thereof, together with a belt and pulley arrangement with belt tension means on the bale thrower for converting the direction of drive to an axis at right angles to the drive shaft.

Variation in the throw-out speed of the bale thrower is accomplished by a variable drive sheave with an axially movable flange having an axial extension. Actuation of the variable drive sheave is effected by a three bar linkage. The engagement between the linkage and movable flange is provided by a collar on the axial extension. When one bar in the linkage bears against the collar, the collar stops rotating and the extension rotates within the collar as the collar urges the movable sheave toward the fixed flange thereby varying the sheave pitch.

A hitch for a steering arm is provided which comprises a U-shaped bracket. A wagon tongue is secured in the bracket by an arm with one end pivoted to one side of the bracket and with the other end secured in a notch of the bracket by a sliding pin.

Cross-reference to related applications

The present invention relates to improvements in the bale thrower disclosed in my co-pending application U.S. Ser. No. 343,698, now Patent No. 3,307,680.

Background of invention

One of the primary difficulties with bale throwers adapted for connection and use with existing balers is to provide an apparatus that can be easily connected to a baler with a minimum of assembly time. Moreover, problems are encountered in transmitting power from the baler to the bale thrower because of the pivotal movement between baler and bale thrower when the bale thrower is in use. Extensive modifications to an existing baler are often required to mount and connect a drive shaft on the baler to supply power to the bale throwing conveyors. Prior bale throwers have utilized a drive shaft running along the side of the baler to transmit power to the bale thrower. This arrangement usually involves cutting openings in the outer baler housing to permit extension of the drive shaft from front to rear along the side of the baler and to keep the drive shaft as close as possible to the baler for safety reasons.

Summary of invention

The present invention obviates these difficulties and eliminates major modifications to the baler by supplying power to the bale thrower by an overhead drive shaft. Ease of installation in a minimum of time is afforded in part by vertically adjustable bearing mountings for the drive shaft which facilitate alignment of the shaft with power connections at each end of the shaft. One of the bearing mountings comprises a slide movable between two brackets.

Further improvements in the power train include a right-angle drive pulley arrangement on the bale thrower which connects the drive shaft to the bale throwing conveyors. The pulley arrangement includes a first shaft and a second shaft transverse to the first shaft, both shafts being supported by the bale thrower. The first shaft is connected to the drive shaft by adjacent universal couplings and alignment of the first shaft and drive shaft is facilitated by adjustable bearing mountings for the first shaft in addition to the adjustable bearing mountings for the drive shaft. The driving connection of the first shaft to the second shaft is made by an endless belt reeved about pulleys secured to each of these shafts, the belt being twisted to change the direction of drive approximately 90°. The belt is guided by an adjustably mounted idler pulley which engages the back of the belt.

Variation in the throw-out speed of the bale thrower conveyors is afforded by a variable drive sheave which is mounted on the second shaft and which drives an endless belt connected to the bale throwing conveyors. The variable sheave of the present invention includes a fixed flange and an axially movable flange, each flange having inclined faces which define a belt groove. The movable flange has an axial extension which provides a bearing surface for a collar riding thereon. The collar provides the connection between a three bar linkage and the movable sheave. When the linkage is actuated to vary sheave pitch one of the links or bars thrusts against the collar and moves the collar and flange axially toward the fixed flange, increasing the groove diameter.

The invention also provides an improved steering bar hitch comprising a U-shaped clevis which includes a right angle bar pivoted to one side of the clevis and which swings into a notch on the other side of the clevis to enclose a wagon tongue. The arm is secured by a sliding pin that closes the notch.

Further objects and advantages of the present invention will become apparent from the following description and accompanying drawnigs in which:

FIGURE 1 is a perspective view of a baler and bale thrower embodying various of the features of the invention.

FIGURE 2 is a fragmentary perspective view of a baler showing one of the drive shaft connections.

FIGURE 3 is a fragmentary plan view of the variable sheave pulley and actuating linkage.

FIGURE 4 is an elevational view in fragmentary section of the variable sheave pulley and linkage shown in FIGURE 3.

FIGURE 5 is a fragmentary perspective view of the bale thrower in FIGURE 1.

FIGURE 6 is an enlarged fragmentary side view of the power connection between baler and bale thrower.

FIGURE 7 is a sectional view along line 7—7 of FIGURE 6.

FIGURE 8 is a fragmentary perspective view of the wagon hitch.

Detailed description

In the drawings. FIGURE 1 shows a bale thrower which is generally designated 10 and which is attached to the discharge end of a baler or bale forming apparatus 12. As best illustrated in FIGURE 5, the bale thrower 10 is generally constructed in accordance with the disclosure of my co-pending U.S. application Ser. No. 343,698 with upper and lower spaced endless conveyors 14 and 16 supported on a frame 18 and adapted to receive a moving bale between the opposed conveying reaches thereof and to accelerate the bale through bale throwing velocity at the discharge end thereof. The conveyors 14 and 16 are driven by driving pulleys 19 and 20 at the discharge end by an endless belt 22. Adjustment of belt tension is provided by an idler pulley 24.

In accordance with the invention, power for the conveyors 14 and 16 is supplied by an improved power train including an overhead drive shift 26 supported above the baler as best illustrated in FIGURE 1, with the forward end of the drive shaft connectable to a power source. By supporting the drive shaft 26 above the baler 12, modifications to the baler frame and housing 27 which were required for connection to previous bale throwers are reduced to a minimum.

The invention also provides adjustable means for supporting the drive shaft and for facilitating alignment of the ends of the drive shaft with the power connections attached thereto. In the disclosed construction, the means supporting the drive shaft 26 above the baler 10 includes, as shown best in FIGURE 1, a forward bearing bracket 28, a rear bearing support 30 and two intermediate bearing supports 32 and 34. Although a single intermediate bearing can be utilized to support the drive shaft, two intermediate bearings will minimize shaft sag and accordingly reduce vibration and bearing wear.

The forward bearing bracket 28 consists of a plate 29 secured to the baler at the lower end by bolts 36. The top of the bearing bracket 28 is supported by a pipe 38 having, at its lower end, a transverse plate 40 which is bolted to the baler 12. The pipe extends angularly upwardly to the approximate height of the drive shaft and then extends horizontally toward a tow vehicle. A strut 42 provides added rigidity. A plate 44 welded or otherwise secured to the pipe is bolted or welded to the forward bearing bracket 28.

Also included in the disclosed construction is means for connecting the forward end of the drive shaft to a power source. In the disclosed construction, such means comprises a pulley 46 secured to the forward end of the drive shaft and an endless belt 48 reeved around the pulley 46 and in a peripheral groove in fly wheel 50 of the baler 12. Any suitable arrangement can be employed to power the fly wheel.

Tension of the belt 48 is maintained by an idler pulley 52 rotatably mounted on one end of a bell crank 54 which is pivoted to the bearing bracket 28 by a bolt 56. The bell crank 54 is biased by a spring 58. Belt tension is adjusted by a threaded shank 62 which has an eye 60 and which is adjustably mounted to the bearing bracket 28.

As best shown in FIGURE 5 the rear and intermediate bearings 30, 32 and 34 for the drive shaft are carried by bearing supports which comprise two brackets 64 secured to the baler 12 and which converge inwardly and upwardly to provide two parallel clamping members 66. A slide 68 vertically movable between the clamping members 66 is adjustably positioned to facilitate alignment of the drive shaft 26 by bolts extending through apertures 67 in the clamping members 66 and through a slot 70 in the slide 68.

Means are provided to connect the drive shaft 26 to the bale thrower 10 for driving the bale throwing conveyors 14 and 16. In accordance with the invention, such means includes a universal coupling 72 which is at the rear end 77 of the drive shaft 26 and which is connected to a second universal coupling 74 secured to a first shaft 76 supported by the bale thrower 10. Power transfer from shaft 76 to a second shaft 91 which is supported in a bearing 95 and which rotates about an axis tranverse to the axis of the drive shaft is afforded by a right-angle drive including an endless belt 80 twisted and reeved about a pulley 78 secured to shaft 76 and a pulley 93 secured to shaft 91. Any tendency of belt 80 to leave the pulley 78 is eliminated by inclining shaft 76 downwardly at an angle of 4° to 5° with respect to the axis of the drive shaft 26.

Included in the means connecting the drive shaft 26 to the bale thrower are means for alignment and support of the shaft 76 at this angle and alignment of the shaft with the drive shaft 26 generally. Such means comprises vertically adjustable bearing mountings for the shaft 76. As best illustrated in FIGURES 6 and 7 two bearings 82 for the shaft are each mounted on plates 84 which are adjustably mounted to opposed parallel side walls 86 of a sub-frame 88 upstanding from the baler frame 18. Each plate 84 has an elongated vertical slot 90. The plates are secured to the sidewalls 86 by bolts 92 extending through the slots 90 and through apertures 94 in the sidewalls 86. Each plate has an inturned upper flange 96 with a threaded stud 98 secured thereto which extends through a top plate 100 of sub-frame 88. Vertical adjustment of the plates 84 and the bearings 82 for alignment of shaft 76 with the drive shaft 26 is accomplished by loosening bolts 92 and threading or unthreading the nuts 102 on the studs 98.

The belt 80 is guided by an idler pulley 112 which is rotatably mounted on a stud 114 secured to a plate 116 having elongated slots 118. Stud 114 extends at an angle tranverse to the shaft 91 and shaft 76 to guide the belt around pulleys 93 and 78. Vertical adjustment to absorb belt slack is afforded by bolts 120 extending through the slots 118 and the side walls.

Variation in the speed of the bale throwing conveyors 14 and 16 to change throw-out distance is accomplished by a variable pitch sheave 119 adjacent a fly wheel 117 on the shaft 91. Sheave 119 has a fixed flange 121 secured to shaft 91 and an axially movable flange 122. Axial movement of the movable flange 122 within a predetermined range is provided by a drive pin or bolt 124 which extends through an aperture in the fixed flange 121 and is tapped into the movable flange 122. The movable flange 122 is biased axially away from flange 121 by tension in belt 22. The flanges 121, 122 have outwardly inclined allochiral faces 127 which together define a groove 129 for the endless belt 22 which travels around pulleys 19, 20 and idler pulley 24. The fixed flange 121 has a hub 131 adjacent face 127. The hub 131 provides the bottom for the belt groove 129 and extends axially toward flange 122 and within an annular recess 133 of flange 122.

A bearing surface for a collar 126 is provided by an axial extension 123 of flange 122 which extends from an annular shoulder 125. Collar 126 co-operates with an actuating linkage for varying sheave pitch. The collar 126 has an axial aperture 128 slightly larger than the outside diameter of extension 123 permitting rotatable movement therebetween.

The actuating linkage for varying the sheave pitch and accordingly the speed of the conveyors and throw-out distance consists of a three bar linkage which includes a yoke 130 pivoted at one end 132 to the baler frame 18 and pivotally connected at the other end to a rod 136 by a bolt 134 extending through a U-shaped bracket 135 secured to rod 136. The yoke 130 comprises two members 138 which can be formed from flat iron and which are bent outwardly to enclose shaft 91 and which converge inwardly at the pivotal connection 132. The collar 126 is provided with a bolt 139 generally parallel to shaft 91 which extends between members 138 preventing rotation of collar 126.

The collar 126 provides the connection or engagement between the linkage and the movable flange 122 and converts the angular movement of the lever and the yoke 130 to an axial thrust on flange 122 thereby urging the belt 22 outwardly of the groove 129 and increasing the pitch. Use of collar 126 on the bearing surface provided by axial extension 123 results in less friction and drag on shaft 91 than direct engagement of yoke 130 with flange 122.

Rod 136 is connected to a lever 140 which is pivoted at 141 to a bracket 142 secured to baler frame 18. The linkage is actuated by a chain 137 or push-pull cable which runs forwardly over the baler 12 and which is manually controlled by the operator of the tow vehicle. Such manual control is afforded by extending the chain 137 through a grommet 143 in the rear bearing support and connecting the chain to a hand crank 144 rotatably supported by pipe 38 for axial movement to afford axial movement of the chain.

The bale thrower 10 is provided with a wagon hitch 148 to support the tongue of a wagon connected in trailing relation to the bale thrower 10. The hitch 148 is pivotally mounted on the end of a steering arm 150 which is connected to the bale thrower 10 at 152 and supported by a spring 154. Hitch 148 comprises a clevis or inverted U-shaped bracket 158 which has depending side legs 170 and 172 and which is pivotally connected to the end of a spring 156 which, in turn, is connected to the steering arm 150. Leg 172 has a notch 164. The clevis 158 is provided with a locking arrangement which includes a bar or arm 160 having a portion 161 generally parallel to the legs 170 and 172 and a portion 162 transverse to the legs. The portion 161 is pivoted to leg 170 about a pivotal axis parallel to leg 170.

In connecting the hitch to a wagon tongue the clevis is lowered over the tongue and arm 160 is pivoted under the tongue with portion 162 entering notch 164. A sliding pin 166 movably mounted at 165 to leg 172 is then dropped, closing the notch and securing arm 160 beneath the tongue.

Various of the features of the invention are set forth in the following claims.

I claim:

1. In a bale thrower which is connectable to a bale forming machine and which has a frame supporting upper and lower opposed bale throwing conveyors which receive and accelerate a bale, the improvement in combination therewith comprising a drive shaft, means adapted for connection to a bale forming machine and including means for vertically adjustably supporting said drive shaft above the bale forming machine, power receiving means on said bale thrower connected to said drive shaft and to said conveyors on said bale thrower and means for adjustably vertically translating said power receiving means.

2. In a bale thrower which is connectable to a bale forming machine and which has a frame supporting upper and lower opposed bale throwing conveyors which receive and discharge a bale, a drive shaft, means for supporting said drive shaft on said frame, and means on said drive shaft for connecting said drive shaft to said conveyors, and a wagon tongue on said frame, the improvement in combination therewith comprising a clevis on said tongue and having first and second depending side legs, said first side leg having a notch, a bar having a first portion pivotally connected to and extending generally parallel to said side legs and a second portion transverse to said legs and extending to said first leg and movable into said notch, and a pin sideably secured to said first leg to close said notch and secure said second portion of said bar in said notch.

3. The combination of a bale forming machine having an overhead drive shaft and means for vertically adjustably supporting said drive shaft on said baling machine and a bale thrower having a frame supporting upper and lower opposed bale throwing conveyors which receive and discharge a bale, power receiving means connected to said drive shaft and to said conveyors, and means for adjustably vertically translating said power receiving means.

4. A combination in accordance with claim 3 wherein said vertically adjustable power receiving means comprises a first shaft, a first bearing, a first plate supporting said first bearing, said plate having an elongated vertical slot and a horizontal flange, a threaded stud secured to said flange, a second bearing in co-axial alignment with said first bearing, a second plate supporting said second bearing, said second plate having an elongated vertical slot and a horizontal flange, a threaded stud secured to said flange of said second plate, a frame having side walls with apertures therethrough and a horizontal wall with apertures therethrough, said studs extending through said horizontal wall apertures, nuts on said studs engaging the surface of said horizontal wall, and bolts extending through said slots in said plates and in said side wall apertures.

5. A combination in accordance with claim 3 wherein said means for vertically adjustably supporting said drive shaft comprises a bearing mounting including two members secured to said bale forming machine and having parallel portions, a slide movable between said parallel portions and having an elongated slot therethrough, a bolt extending through said parallel portions and through said slot, and a bearing on said slide and receiving said drive shaft.

6. A combination in accordance with claim 3 wherein said power receiving means includes a power receiving shaft and wherein said power receiving shaft is inclined forwardly and downwardly toward said drive shaft at an angle of about four degrees to five degrees.

7. A combination in accordance with claim 3 wherein said power receiving means includes a power receiving shaft and wherein said combination also includes a first universal coupling connected to said drive shaft, a second universal coupling connected to said power receiving shaft and to said first universal coupling, a second shaft mounted on said frame transversely of and below said power receiving shaft, a pulley on said second shaft, an endless belt reeved around said pulleys, and an idler pulley rotatably and adjustably mounted on said frame about an axis transverse to said power receiving and second shafts and engaging said endless belt.

8. A combination in accordance with claim 7 wherein said means for vertically adjustably supporting said power receiving shaft on said frame comprises a side wall member on said frame and having an aperture therethrough, a horizontal wall member on said frame and having an aperture therethrough, a bearing, a plate supporting said bearing and having an elongated vertical slot and a horizontal flange, a threaded stud secured to said flange and extending through said aperture in said horizontal wall member, a nut on said stud engaging the surface of said horizontal wall member, and a bolt extending through said slot in said plate and through said aperture in said side wall member.

9. A combination in accordance with claim 8 wherein said power receiving shaft is inclined forwardly and downwardly toward said drive shaft at an angle of about four degrees to five degrees.

10. A bale thrower including a frame, a first shaft, a pulley on said first shaft, means for vertically adjustably supporting said first shaft on said frame, a second shaft mounted on said frame transversely of and below said first shaft, a pulley on said second shaft, an endless belt received around said pulleys on said first and second shafts, an idler pulley rotatably and adjustably mounted on said frame about an axis transverse to said first and second shaft, said idler pulley engaging said endless belt, and a universal coupling on said first shaft adapted for connection to a power source.

11. A combination in accordance with claim 10 wherein said means for vertically adjustably supporting said first shaft on said frame comprises a side wall member on said frame and having an aperture therethrough, a horizontal wall member on said frame and having an aperture therethrough, a bearing, a plate supporting said bearing and having an elongated vertical slot and a horizontal flange, a threaded stud secured to said flange and extending through said aperture in said horizontal wall member, a nut on said stud engaging the surface of said horizontal wall member, and bolts extending through said slot in said plate and through said aperture in said side wall member.

12. A bale thrower including a frame supporting upper and lower opposed bale throwing conveyors which receive and discharge a bale, a drive shaft on said frame, a variable pitch sheave connecting said drive shaft to said conveyors, said sheave including a movable flange having thereon an axial extension, a collar freely rotatable on said axial extension, a yoke having one end pivoted to said frame and engaged with said collar, a rod pivotally connected to the other end of said yoke, a lever connected to one end of said rod and pivoted intermediate the ends thereof on said frame, and means attached to the other end of said lever and extending forwardly of said bale thrower for manual movement of said lever by the operator of a tow vehicle.

13. A bale thrower in accordance with claim 12 including means preventing relative rotation between said yoke and said collar.

14. A bale thrower in accordance with claim 13 wherein said means preventing relative rotation between said yoke and said collar comprises a bolt extending from said collar and engaging said yoke to thereby prevent rotation of said collar.

References Cited

UNITED STATES PATENTS

| | | | |
|---|---|---|---|
| 2,130,433 | 9/1938 | Webb | 198—203 |
| 2,939,571 | 6/1960 | Robertson | 198—208 |
| 3,095,962 | 7/1963 | Hollyday | 198—128 |
| 3,227,262 | 1/1966 | May | 198—128 |
| 3,291,284 | 12/1966 | May et al. | 198—128 |
| 3,308,926 | 3/1967 | James | 198—128 |

RICHARD E. AEGERTER, *Primary Examiner.*